United States Patent Office 3,524,906
Patented Aug. 18, 1970

3,524,906
TRANSPARENT AND WEATHERABLE POLYMER BLENDS OF ACRYLATE POLYMERS AND POLYVINYLIDENE FLUORIDE
Joseph Michael Schmitt, Ridgefield, and Charles Hartley Miller, Jr., Stamford, Conn., assignors to American Cyanamid Company, Stamford, Conn., a corporation of Maine
No Drawing. Filed Oct. 10, 1967, Ser. No. 674,094
Int. Cl. C08f 29/12
U.S. Cl. 260—900
7 Claims

ABSTRACT OF THE DISCLOSURE

Transparent and weatherable polymer blends of polymers of methyl methacrylate, polymers of ethyl acrylate and polyvinylidene fluoride and a method for their production are disclosed.

BACKGROUND OF THE INVENTION

Polymers of methyl methacrylate wherein the methyl methacrylate is the major constituent and polymers of ethyl acrylate wherein ethyl acrylate is the major constituent have previously been blended together in order to produce compositions combining the best properties of each component into the final blend. The resultant systems, however, have not proven satisfactory for utilization in applications wherein a high degree of light transmission is necessary or desirable.

We have now found that we can obtain transparent polymer systems which possess not only those attractive properties of the prior ethyl acrylate-methyl methacrylate polymer blends, but are also transparent and weather-resistant, by the incorporation of various specific amounts of polyvinylidene fluoride throughout the body thereof.

SUMMARY OF THE INVENTION

As mentioned above, our novel polymer compositions are transparent and weather-resistant and therefore can be utilized, as such or pigmented, as coatings for wood, metal, wood products, non-weatherable plastics such as polyvinyl chloride, polystyrene, ABS polymers and the like. They may also be utilized as decorative laminates wherein the composition is laminated to, for example, a wood-polymer print sheet-core sandwich utilizing known laminating conditions.

DESCRIPTION OF THE INVENTION INCLUDING PREFERRED EMBODIMENTS

The compositions of the present invention can comprise from about 1% to about 99% of the ethyl acrylate polymer and correspondingly from about 99% to about 1% of the methyl methacrylate polymer. These two components may be blended together utilizing known techniques and devices such as rubber mills, Banbury mixers, sigma mixers, devolatilizer-extruders and the like.

The polymers of methyl methacrylate and ethyl acrylate which are used in the present invention may each be used in the form of homopolymers or copolymers with various monomers copolymerizable therewith and containing a polymerizable $CH_2=C<$ group. When copolymers are utilized they should contain at least about 95%, by weight, of the ethyl acrylate or methyl methacrylate and not more than 5%, by weight, of the monomer copolymerizable therewith, based on the weight of the resultant copolymer.

Examples of monomers which can be copolymerized with the methyl methacrylate or ethyl acrylate and which can be polymerized either singly or in a plurality (two, three, four or any desired number), the latter often being desirable in order to improve the compatibility and copolymerization characteristics of the mixture of monomers and to obtain copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic benzoylphthalic, etc., acids; the saturated monohydric alcohol esters, e.g., the methyl, ethyl, propyl, isopropyl, butyl, sec.-butyl, amyl, etc., esters of ethyleneically unsaturated aliphatic monobasic and polybasic acids, illustrative examples of which appear above including acrylic and methacrylic acids; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the ethyl acrylate or methyl methacrylate are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be utilized are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endo-methylene tetrahydrophthalic anhydride, triallyl tricarballylate, triallyl cyanurate, triallyl citrate, triallyl phosphate tetrallyl silane, tetrallyl silicate, hexallyl disiloxane, etc. Other examples of allyl compounds that may be employed are given, for example in U.S. Pat. No. 2,510,503, issued June 6, 1950.

Among the comonomers which are preferred for use

3 in carrying our invention into effect are, for example, compounds such as acrylonitrile, and other compounds, e.g., the various substituted acrylonitriles (e.g., methylacrylonitrile, ethacrylonitrile, phenylacrylonitrile, etc.), the various N-substituted acrylamides and alkacrylamides, for instance, N-dialkyl acrylamides and methacryamides, e.g., N-dimethyl, -diethyl, -dipropyl, -dibutyl, etc., acrylamides and methacrylamides. Other monomers copolymerizable with the instant novel monomers are given, for instance, in U.S. Pat. No. 2,601,572, dated June 24, 1952, where examples are given both by classes and species.

As mentioned above, the acrylate and the methacrylate blends known in the art are opaque and not particularly weatherable. According to our invention, the addition of polyvinylidene fluoride in amounts ranging from about 23% to about 27%, by weight, based on the total weight of the methyl methacrylate polymer and the polyvinylidene fluoride, regardless of the ethyl acrylate polymer content, results in the production of transparent and weatherable compositions.

The method of producing our novel systems is not critical and any of the component polymers can be added in any sequence to the others without detracting from the attractive properties of the resultant systems set forth herein above.

Our novel composition can be utilized as such, or after having been modified with known additives such as dyes, pigments, fillers, stabilizers, antioxidants, photochromic materials and the like without detracting from the excellent properties obtained.

The following examples are set forth for purposes of illustration only and are not to be construed as limitations on the present invention except as set forth in the appended claims. All parts are percentages and by weight unless otherwise specified.

EXAMPLE 1

To a six-inch rubber mill, heated to 180° C., are added 60 parts of poly(methyl methacrylate) and 20 parts of poly(ethyl acrylate). The resultant blend is opaque but otherwise processable. To the blend, on the same blending apparatus, are then added 20 parts of polyvinylidene fluoride. The resultant composition is transparent, i.e., has a light transmission of about 85%.

EXAMPLE 2

To a similar apparatus as disclosed in Example 1, are added 320 parts of an opaque polymeric blend of 22% poly(ethyl acrylate) and 78% poly(methyl methacrylate). To the resultant material are added 80 parts of polyvinylidene fluoride. The resultant molding composition is essentially colorless and transparent.

EXAMPLE 3

100 parts of an opaque poly(methyl methacrylate)-poly(ethyl acrylate)-(73/27) blend is blended with 27 parts of polyvinylidene fluoride on a six-inch rubber mill at 180° C. A transparent blend of the three polymers is obtained. This blend is extruded into a 3-5 mil film on a 1" Killion laboratory extruder. The resultant film has good transparency and toughness.

Physical properties of the blends of Examples 2 and 3 were obtained at 23° C. and at −20° C. These properties are listed in Table I, below.

TABLE I.—YIELD PROPERTIES

| Blend, 23° C. | Tensile strength, p.s.i. | Elongation, percent | Modulus, p.s.i. |
| --- | --- | --- | --- |
| (That of Ex. 2) | 5.5×10³ | 3.6 | .23×10⁶ |
| (That of Ex. 3) | 3.7 | 3.5 | .16 |
| Blend, −20° C. | | | |
| (That of Ex. 2) | 10.5×10³ | 5.5 | .35×10⁶ |
| (That of Ex. 3) | 7.1 | 6.2 | .24 |

4

EXAMPLE 4

Decorative laminates are prepared using the film of Example 3 as the surfacing material. The Example 3 blend is laminated to a wood-melamine/formaldehyde print sheet and a core made of kraft phenolic paper. Temperatures of 150–160° C. and pressures of 1,000–1,100 p.s.i. for 20–30 minutes are employed.

The laminates obtained have a good surface transparency and color. These laminates, after weatherometer and outdoor exposure, show no changes after 5,000 hours of weatherometer and one year of outdoor exposure.

A laminate is also prepared using a plywood substrate. The Example 3 blend is laminated to this substrate at 130°–140° C., 300–400 p.s.i. for 15 minutes. The bond appears good and samples, after weatherometer and outdoor exposure, show the same results as set forth above.

EXAMPLES 5–9

The procedure of Example 2 is again followed except that varying amounts of poly(methyl methacrylate), poly(ethyl acrylate) and polyvinylidene fluoride are used according to the instant invention. The results are set forth in Table II, below.

TABLE II

| Ex. | PEA, parts | PMMA, parts | PVDF, parts | Transparency |
| --- | --- | --- | --- | --- |
| 5 | 1 | 99 | 33 | Excellent. |
| 6 | 25 | 75 | 25 | Do. |
| 7 | 50 | 50 | 17 | Do. |
| 8 | 75 | 25 | 8 | Do. |
| 9 | 99 | 1 | 0.33 | Do. |

PEA=poly(ethyl acrylate); PMMA=poly(methyl methacrylate); PVDF=polyvinylidene fluoride.

EXAMPLE 10

To a suitable mixing vessel is added an opaque blend of 75 parts of a copolymer of methyl methacrylate and ethyl acrylate (95/5) and 25 parts of poly(ethyl acrylate). To this blended product are then added 26 parts of polyvinylidene fluoride. After blending for 10 minutes at 180° C. the resultant composition is recovered. It is transparent and is substantially unaffected by 1,000 hours of ultraviolet irradiation.

We claim:

1. A transparent, weatherable composition comprising a blend of (1) a polymer of ethyl acrylate containing at least about 95% by weight of ethyl acrylate, (2) a polymer of methyl methacrylate containing at least about 95% by weight of methyl methacrylate in a ratio of from about 1% to about 99% to about 99% to about 1%, respectively, and (3) from about 23% to about 27%, by weight, of polyvinylidene fluoride, based on the total weight of said (2) and said (3).

2. A composition according to claim 1 wherein said methyl methacrylate polymer is poly(methyl methacrylate) and said ethyl acrylate polymer is poly(ethyl acrylate).

3. A composition according to claim 1 wherein said methyl methacrylate polymer contains up to about 5%, by weight, of a comonomer copolymerizable therewith.

4. A composition according to claim 1 wherein said polyvinylidene fluoride contains up to about 5%, by weight, of a comonomer copolymerizable therewith.

5. A method of producing the composition of claim 1 which comprises blending from about 23% to about 27%, by weight, of polyvinylidene fluoride with about a 1 to 99 to 99 to 1 blend of a polymer of ethyl acrylate and a polymer of methyl methacrylate, said amount of fluoride being based on the total weight of said fluoride and said methyl methacrylate polymer.

6. A laminate produced from the composition of claim 1.

7. A coating produced from the composition of claim 1.

References Cited
UNITED STATES PATENTS

| | | | |
|---|---|---|---|
| 3,340,222 | 9/1967 | Fang | 260—41 |
| 3,324,069 | 6/1967 | Koblitz et al. | 260—31.4 |
| 3,054,761 | 9/1962 | Morre et al. | 260—2.5 |
| 3,459,834 | 8/1969 | Schmitt | 260—898 |
| 3,253,060 | 5/1966 | Roblitz et al. | 260—900 |

MURRAY TILLMAN, Primary Examiner

C. J. SECCURO, Assistant Examiner

U.S Cl. X.R.

117—148; 161—251